UNITED STATES PATENT OFFICE.

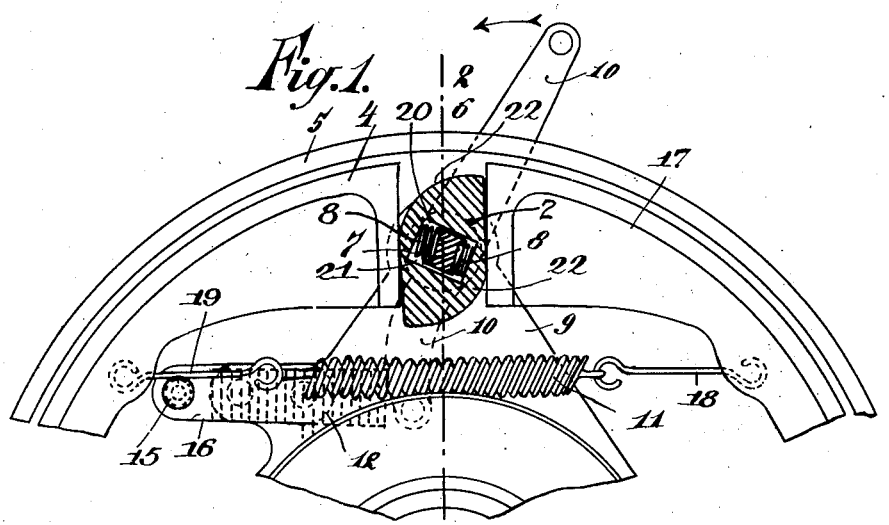
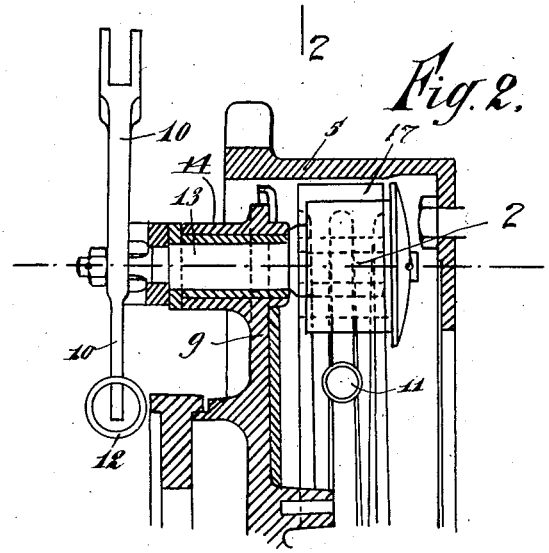

OTTO PFÄNDER, OF BRUSSELS, BELGIUM.

BRAKE-OPERATING DEVICE.

No. 920,643.        Specification of Letters Patent.        Patented May 4, 1909.

Application filed March 25, 1907.   Serial No. 364,336.

*To all whom it may concern:*

Be it known that I, OTTO PFÄNDER, a subject of the German Emperor, residing at Brussels, in the Kingdom of Belgium, have invented certain new and useful Improvements in Brake-Operating Devices, for which application has been made in France, August 3, 1906; Germany, August 6, 1906; Great Britain, August 8, 1906, and Belgium, August 10, 1906.

This invention relates to improvements in brake operating devices and is especially adapted for use in connection with motor vehicles although its utility is not confined to this type of machines.

The device of my invention is designed for use in connection with that class of devices which comprise generally a braking drum or like member adapted to be acted upon by a plurality of displaceable members and the object of my invention is to provide displacing means so constructed that when operated to perform its function an equal displacing action will be imparted to each of the displaceable members and said means will not only serve to operate upon said members to equally distribute the wear thereon but in case said members are unequally worn the device of my invention will serve to impart an equal amount of displacing action to each of said members thereby resulting not only in a more efficient braking action but in a final equalization of said members, in point of wear, as a result of the equal pressure imparted.

The invention will be more fully described in connection with the accompanying drawing and will be more particularly pointed out and ascertained in and by the appended claims.

In the drawing:—Figure 1 is a fragmentary view partly in elevation and partly in section of a device embodying the main features of my invention. Fig. 2 is a sectional view on line 2—2 of Fig. 1. Fig. 3 is a detail view of a modified form of the invention.

Like numerals of reference designate similar parts throughout the different figures of the drawing.

The invention will now be described in connection with the specific embodiment shown but it will be understood that the invention is not to be limited by such specific showing except for such limitations as the claims import.

A suitable support for the brake operating means is indicated by 9 and may be of any desired construction and as shown is provided with a sleeve 14 carrying a brake shaft 13. An operating lever 10 is rigidly secured to said shaft 13 and is connected with yieldingly acting means, preferably in the form of a spring 12 whereby it is held in a normal position, said spring 12 being connected at its other end at 15 to a suitable stationary part such for instance as an extension 16 on the support 9. A braking member which as shown is in the form of a drum 5 may be connected in any desirable manner with the driving elements of the vehicle but as such connection forms no part of the present invention and as it may be formed in any desirable manner the same is not herein shown. Displacing members 4 and 17 are herein shown disposed in a manner to operate in connection with the drum 5 preferably by engagement with the inner surface thereof. Means are desirably employed for normally maintaining said members out of engagement with the drum 5 and as shown said means consists of a spring 11 connected by links 18 and 19 with said members 17 and 4 respectively. Any suitable mounting may be provided (not shown) to afford requisite movement of said displaceable members to enable them to perform the functions hereinafter set forth. Means are provided for engaging said displaceable members and effecting uniform displacing action thereof and preferably said means is in the form of a cam which coöperates with a device for effecting its rotation in such a manner that positive rotative movement is imparted to the cam but the same is allowed a limited amount of movement with respect to said device and as shown said cam may be afforded positive engagement with said device in the performance of its function after such limited movement has been taken up. In the most preferred embodiment of the invention there is interposed between said device and the cam yieldingly acting elements the function of which is to impart a gradual braking action to said displaceable members.

Referring now to the specific construction shown the shaft 13 is provided with an end portion 7 of polygonal cross-section operatively associated with a cam 2. Preferably said cam 2 is provided with an opening 20 through which the portion 7 projects and said opening 20 is adapted to fit closely against two sides of the portion 7 to provide for positive engagement with the cam and is somewhat larger than the end portion 7 at opposite points indicated by 21 to permit relative movement of the cam with respect to said end portion 7. In the embodiment shown those parts of the cam and the end portion 7 adapted for positive engagement with each other are for the purposes of rotating the cam 2. Springs 8 are interposed between the opposite sides of said end portion 7 in the spaces 21 of the cam 2 for engagement with the cam to normally hold the latter in the position shown with respect to said portion 7. Said cam 2 is provided with operating cam-surfaces 22 adapted for engagement with the ends of the members 4 and 17.

When power is applied to the outer end of lever 10, by any suitable means not herein shown, and said lever is swung against the action of spring 12 in the direction of the arrow rotary movement is imparted to the member 7 through shaft 13 and said member 7 positively engages the cam 2 to rotate the same and bring the operating or cam surfaces 22 into engagement with the members 4 and 17 whereby the latter are displaced and forced into engagement with the drum 5. If there is any inequality or difference between the members 4 and 17 as the result of wear or imperfection in the metal the cam 2 after or before effecting engagement between said members 4 and 17 with the drum 5 will be displaced with respect to the portion 7 in a manner to exert an equal pressure on each of said members 4 and 17. Assuming that the member 4 has become worn to a greater extent than the member 17 it will be obvious that a more extended movement will have to be imparted to the member 4 to bring it into engagement with the drum 5 than would be necessary to effect such engagement of the member 17. In this case the cam 2 would be retained in a normal position with respect to the part 7 until engagement has been effected between the member 17 and the drum 5 whereupon further rotation of the cam would result in displacing it toward the member 4 by reason of its engagement with the member 17 until said member 4 had become engaged with the drum 5; thereupon the cam 2 having effected engagement of both members 4 and 17 would exert an equal pressure on both of said members upon further rotation of the shaft 13. It will thus be seen that the cam 2 not only equalizes pressure exerted on said members but should one of said members wear more rapidly than the other said cam would tend to restore said members to an equal size. It will be obvious from the foregoing that while the springs 8 are desirable and afford many advantages by reason of the fact that they maintain the cam 2 in a normal position with respect to the portion 7 still said springs are not essential to the full realization of the invention as the device thereof would operate effectively without said springs.

In Fig. 3 there is shown a modified form of the invention wherein there is illustrated leaf springs 23 which engage the part 7' in place of the spiral springs shown in the preferred form.

I claim:—

1. In combination, a braking member, displaceable members adapted to coöperate therewith, a cam for displacing said members to effect engagement thereof with said braking member and provided with an elongated slot, and a shaft engaging the walls of said slot to positively rotate said cam, said slot permitting movement of said cam with respect to said shaft.

2. In combination, a braking member, displaceable members adapted to coöperate therewith, a cam for displacing said members to effect engagement thereof with said braking member and provided with an elongated slot, a shaft engaging the walls of said slot to positively rotate said cam, said slot permitting movement of said cam with respect to said shaft, and springs interposed between said shaft and cam.

In testimony whereof I affix my signature in presence of two witnesses.

OTTO PFÄNDER.

Witnesses:
L. LARETTE,
GREGORY PHELAN,